(12) United States Patent
Huang et al.

(10) Patent No.: US 8,418,049 B2
(45) Date of Patent: Apr. 9, 2013

(54) STAKEHOLDER MATRIX

(76) Inventors: Ying Huang, Yorktown Heights, NY (US); Jim Laredo, Katonah, NY (US); Markus Gero Stolze, Mount Kisco, NY (US); Piyawadee Sukaviriya, Armonk, NY (US); Brian White, Brookfield, CT (US); Kuo Zhang, Beijing (CN)

(*) Notice: Subject to any disclaimer, the term of this patent is extended or adjusted under 35 U.S.C. 154(b) by 1157 days.

(21) Appl. No.: 11/781,605

(22) Filed: Jul. 23, 2007

(65) Prior Publication Data

US 2009/0031204 A1 Jan. 29, 2009

(51) Int. Cl.
*G06F 17/16* (2006.01)

(52) U.S. Cl. ............................. 715/212

(58) Field of Classification Search ........... 715/212
See application file for complete search history.

(56) References Cited

U.S. PATENT DOCUMENTS

| | | | |
|---|---|---|---|
| 6,463,431 B1* | 10/2002 | Schmitt | 1/1 |
| 7,483,841 B1* | 1/2009 | Jin et al. | 705/7 |
| 2003/0018506 A1* | 1/2003 | McLean et al. | 705/7 |
| 2006/0084430 A1* | 4/2006 | Ng | 455/426.1 |
| 2008/0065458 A1* | 3/2008 | Sullivan et al. | 705/9 |
| 2008/0177610 A1* | 7/2008 | Jones | 705/8 |

OTHER PUBLICATIONS

Theus, M. (2002) Interactive Data Visualization using Mondrian. Journal of Statistical Software, 7(11), vol. 7, Issue 11, pp. 1-9, Nov. 22, 2002, Augsburg, Germany.

Y. Sure, A. Maedche, and S. Staab. Leveraging Corporate Skill Knowledge—From ProPer to OntoProPer. In Proceedings of the 3rd International Conference on Practical Aspects of Knowledge Management (PAKM 2000), pp. 1-12, Oct. 30-31, 2000, Basel, Switzerland.

Colucci, S., T. Di Noia, E. Di Sciascio, F.M. Donini, G. Piscitelli, S. Coppi, Knowledge Based Approach to Semantic Composition of Teams in an Organization. In Proceedings of 20th Annual ACM Symposium on Applied Computing, pp. 1314-1319, SAC'05 Mar. 13-17, 2005, Santa Fe, New Mexico, USA.

Lockhart H., L. Parducci, A. Anderson (2005) OASIS eXtensible Access Control Markup Language (XACML) Version 2.0. OASIS XACML-TC, pp. 1-141, Feb. 1, 2005. http://www.oasis-open.org/committees/xacml.

* cited by examiner

*Primary Examiner* — Laurie Ries
*Assistant Examiner* — Tionna Smith
(74) *Attorney, Agent, or Firm* — F. Chau & Associates, LLC; Daniel P. Morris, Esq.

(57) ABSTRACT

A system implementing a situation-oriented directory for retrieving a stakeholder identification includes a memory storing a relational database corresponding to the situation-oriented directory including a plurality of attribute-value combinations and a plurality of stakeholder identifications, wherein the plurality of attribute-value combinations are mapped to the plurality of stakeholder identifications such that for each attribute-value combination exactly one stakeholder is mapped, and a processor in communication with the memory for receiving a query and retrieving the stakeholder identification from among the plurality of stakeholder identifications based on the attribute-value combinations.

10 Claims, 3 Drawing Sheets

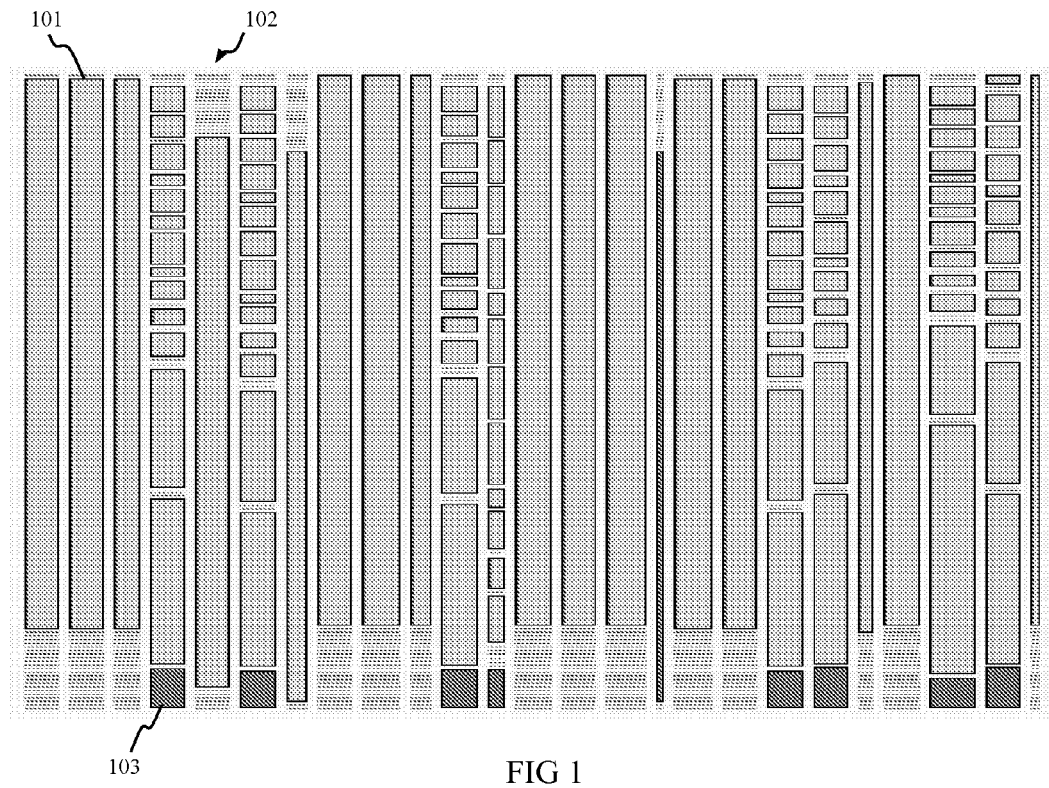

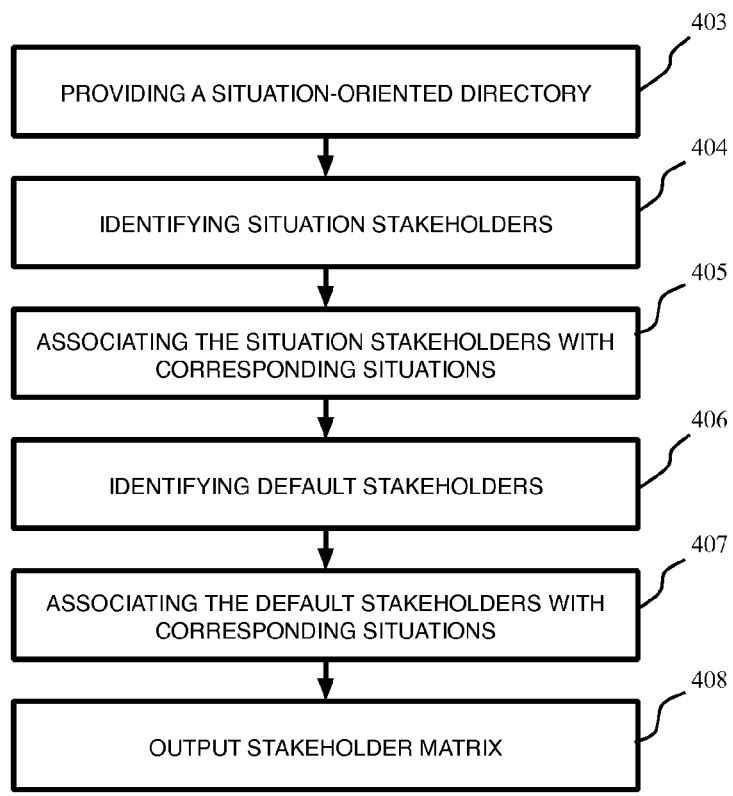
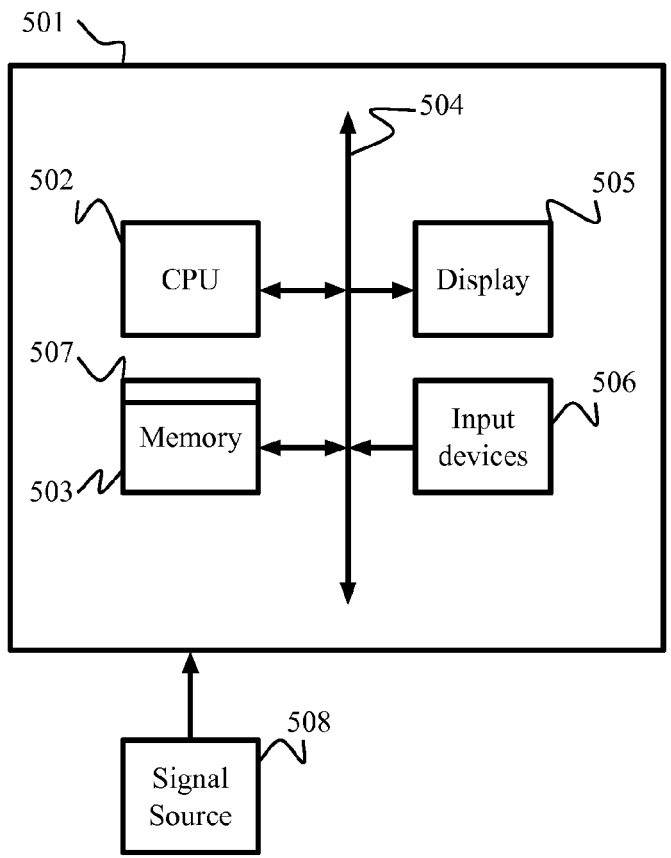

STAKEHOLDER MATRIX

BACKGROUND OF THE INVENTION

1. Technical Field

The present invention relates to a system and method for a situation-oriented directory and more particularly to a stakeholder matrix.

2. Description of Related Art

Expert finding systems are similar to situation-oriented directories in that they support the identification of people who can provide help with a particular problem. Users of expert finding want to find experts in a domain of expertise or compose a team of people that is able to address a larger problem requiring expertise from multiple domains. Expertise domains are typically organized in a hierarchical fashion, but also attribute-based description of expertise domains have been explored. In expert finding system the completeness and uniqueness of domain coverage is less important. That is, having some domains not covered by any expert and having multiple experts in some domains is acceptable in expert finding systems. Thus, validation of completeness and uniqueness is not an issue for expert finding systems. Instead, it is more important for expert finding systems that they are up-to-date and that information can be collected and updated with minimal effort. This is why many expert finding systems rely on automatic collection of mapping information by extracting information from document collections. The collected information is typically not further processed.

No known system supports access control for returning exactly one subject for an attribute-value combination. Therefore, a need exists for a system and method for a stakeholder matrix.

SUMMARY OF THE INVENTION

According to an embodiment of the present disclosure a system implementing a situation-oriented directory for retrieving a stakeholder identification includes a memory storing a relational database corresponding to the situation-oriented directory including a plurality of attribute-value combinations and a plurality of stakeholder identifications, wherein the plurality of attribute-value combinations are mapped to the plurality of stakeholder identifications such that for each attribute-value combination exactly one stakeholder is mapped, and a processor in communication with the memory for receiving a query and retrieving the stakeholder identification from among the plurality of stakeholder identifications based on the attribute-value combinations.

According to an embodiment of the present disclosure, a method for retrieving a stakeholder identification from a situation-oriented directory includes providing a relational database corresponding to the situation-oriented directory including a plurality of attribute-value combinations and a plurality of stakeholder identifications, wherein the plurality of attribute-value combinations are mapped to the plurality of stakeholder identifications such that for each attribute-value combination exactly one stakeholder is mapped, receiving a query including an attribute and a value, and retrieving the stakeholder identification from among the plurality of stakeholder identifications based on the attribute-value combinations, wherein situation corresponding to the attribute is located in the stakeholder matrix and one of a default stakeholder and a situation stakeholder is returned, wherein the default stakeholder is returned where no situation stakeholder matches the value, otherwise a situation stakeholder matching the value is returned.

A method for compacting a situation-oriented directory into a stakeholder matrix including receiving the situation-oriented directory as an input, identifying situation stakeholders in the situation-oriented directory, associating, in the stakeholder matrix, the situation stakeholders with corresponding situations, identifying default stakeholders in the situation-oriented directory, associating, in the stakeholder matrix, the default stakeholders with situations for which no situation stakeholder is defined in the stakeholder matrix, and outputting the stakeholder matrix wherein one stakeholder is assigned for each situation and all situations have one of a default stakeholder and a situation stakeholder such that assignments of stakeholders to situations are complete and consistent.

BRIEF DESCRIPTIONS OF THE DRAWINGS

Preferred embodiments of the present disclosure will be described below in more detail, with reference to the accompanying drawings:

FIG. 1 is a mosaic plot of the records of situation oriented directory according to an embodiment of the present disclosure;

FIG. 2 is a user interface sketch for stakeholder matrix table combining the display of area stakeholder assignments and situation assignments according to an embodiment of the present disclosure;

FIG. 4B is a flow chart of a method for generating a stakeholder matrix according to an embodiment of the present disclosure; and FIG. 5 is a diagram of a system according to an embodiment of the present disclosure.

DETAILED DESCRIPTION OF PREFERRED EMBODIMENTS

Figure 3:
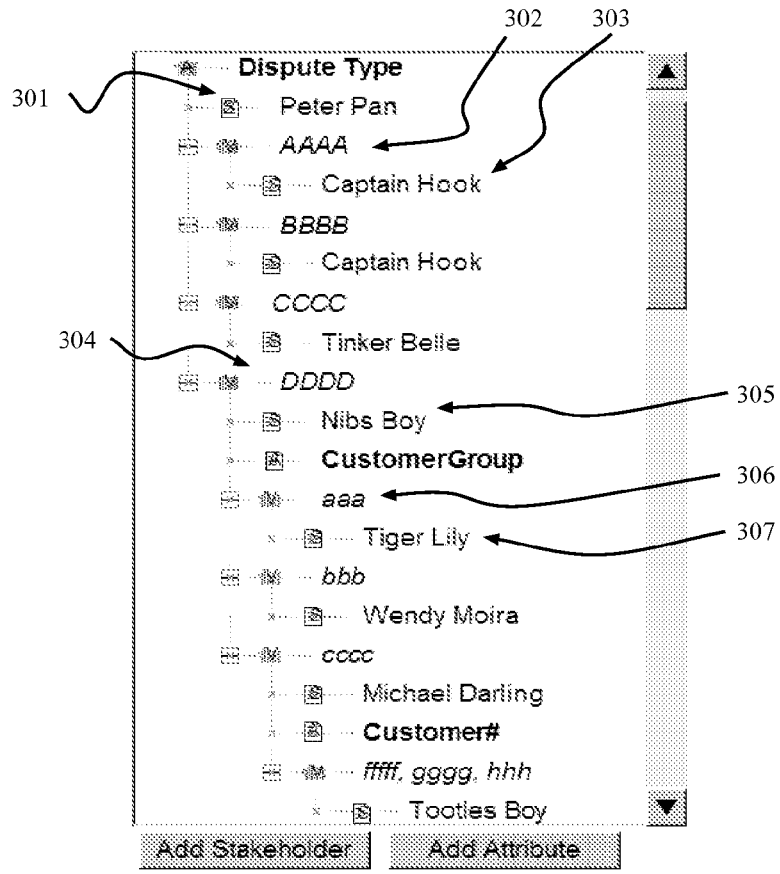
FIG. 3 is a user interface sketch of a compact tree display of the stakeholder assignment information according to an embodiment of the present disclosure.

Situation-Oriented Directories help to determine the stakeholder responsible for a given situation. Defining all responsibility assignments for a directory can be challenging if situations need to be distinguished by many attributes and some of the attributes have many potential values. A stakeholder matrix is a compact representation of a situation-oriented directory for indicating completeness and consistency of the assignments in the directory. Experimental evaluation showed that in a real world case the number of responsibility assignments could be compacted from 33700 to 128.

When sales or service representatives interact with clients, it is sometimes necessary to identify the person responsible for providing authoritative information and making decisions. For example, when closing a complex sale, a qualified and authorized person needs to be involved to negotiate the discounts and determine the tax rates and shipping rates for orders. Similarly, life insurance companies will only allow a well-defined group of actuaries to provide a quote for high risk life insurance.

In large, highly differentiated organizations it can be difficult to determine who is responsible to interact with clients in a particular situation. Frequent job rotations and re-organizations make it even more difficult to know who is responsible for what. Corporate directories can provide some help, but typically, they only provide the hierarchical, departmental structure of the organization. This is of limited use for identifying the person that is responsible for a given situation.

Finding the right person is even more difficult when client interactions are outsourced to another organization (e.g., a centralized call center) where employees have very limited knowledge of the organization for which they are providing the service. For example, an agent at a service center that tracks invoice payments and calls debtors about outstanding payments needs to be able to identify the stakeholder that is able to handle a dispute related to an invoice. What is needed here is a specialized directory that allows identifying stakeholders based on the attributes of the current situation such as the type of dispute, the customer group, and the customer number. Providing a user interface to such a situation-oriented directory is comparatively simple. What is more difficult is to elicit all the needed information and to keep it up-to-date. If situations are distinguished by many attributes or some of the attributes have many distinct attribute values, then the number of assignment records needed to identify a stakeholder for each possible combination of attribute values will be quite large, the product of the size of the attribute value sets.

An embodiment of the present disclosure will be described in terms of an exemplary case; a situation-oriented directory for an invoice management business service. It should be noted that embodiments of the present disclosure may be applied in other cases, for example, for access control, message handling, etc.

A business service may be offered that tracks invoice payments, reminds customers of outstanding payments, and coordinates the resolution of disputes. The service is provided through a mixture of local and centralized service centers. When a dispute regarding an invoice has been identified, the person responsible for handling the dispute in the billing organization has to be involved. Agents use a situation-oriented directory that retrieves the name of the stakeholder, which is the responsible person for a situation, based on the type of dispute and the information in the invoice. The directory uses a relational database to store the assignment records that map an attribute-value combination to an identifier of the responsible person. FIG. 1 shows a "mosaic plot" of data from an operational directory for a single billing organization.

FIG. 1 shows a plot listing 25 dispute types (x axis) against 24 responsible stakeholders (y axis). First areas (e.g., 101) represent the number of records. The horizontal lines (e.g., 102) indicate that no records with that value are in the data base. Second areas (e.g., 103) within the first areas show "selected" records. In this case these are assignments related to a specific customer group. The selection shows that for most dispute types the selected customer group directly defines the responsible stakeholder, but that there are some dispute types for which the responsibility is defined at the level of the individual company identifier (e.g. 12$^{th}$ dispute type from the left).

The plot was created with the Mondrian data visualization tool; it maps the assignment records according to two attributes: Dispute Type (horizontal), and Stakeholder Identifier (vertical). The second areas 103 indicate the responsibility of stakeholders for a given group of customers. The directory lists 24 stakeholders and their individual responsibility for situations described by 25 types of disputes, 7 customer groups, and 1348 customer identifiers. As each customer is only part of a single group, there have to be 33700=(25*1348)=(#disputes*#customerIDs) assignment records in the database to list all combinations of possible values. As visible in the mosaic plot, in this directory some types of disputes are handled by a single stakeholder, while other disputes are handled by different stakeholders depending on the customer or the customer group. Other situation-oriented directories use other invoice attributes to define the situational responsibility of stakeholders.

Referring now to a stakeholder matrix (see for example, FIGS. 2 and 3) for supporting a modeling of situation responsibility; creating the assignment records of a situation-oriented directory using standard tools such as Excel is challenging if the number of assignment records needed is large. A large number of records makes it difficult to manually check the validity of the directory information. For a directory to be valid there has to be for each situation exactly one assigned stakeholder. That is, all situations must have a defined stakeholder such that the assignments are complete and the same situation always gets assigned to the same stakeholder such that assignments are consistent.

The properties of completeness and consistency of assignments can be checked by performing the corresponding queries against a relational database that contains the full listing of assignment records.

Using a set notation, the set of assignments D that make up the situational directory can be written as D={($a_1, a_2, \ldots a_k, s$)|$a_1 \in A_1, a_2 \in A_2, \ldots a_k \in A_k, s \in S$} with $A_i$ ($i \in [1,k]$) being the situation attributes such as Distribute Type, Customer Group, and Customer Number; S is the set of stakeholders. Thus, D assigns each row in the Cartesian Product of $A_i$($i \in [1,k]$) to a stakeholder. Written this way the consistency of a new assignment of responsibility to a stakeholder s(r=($a_1, a_2, \ldots a_k, s$)) can be checked by ensuring that the directory does not yet contain any assignment for $a_1, a_2, \ldots a_k$. A directory B is completely consistent if this relation holds for each responsibility assignment r in D. Given a directly that is consistent, the completeness of the directory can simply be checked by ensuring that the number of assignment in the directory is equal to he product of sizes of all $A_i$($i \in [1,k]$). That is, the directory enumerates the full Cartesian product of all attribute values.

Automatic analysis is used when working with a long list of individual assignment records. The alternative is to let users work with a compact representation of the directory that makes it easier to ensure the completeness and consistency of the information. A compact representation, the "stakeholder matrix", includes the definition of the default stakeholder (e.g., in FIG. 2, "Bob Hess" 201), the assignment of default stakeholders to specialization areas and the definition of the exceptional situations within each specialization area and the assignment of a situation stakeholder (e.g., in FIG. 2, "Jennifer Smith" 202) to each of them.

The default stakeholder 201 is the person that is responsible for all situations for which no area stakeholder is defined. By defining a default stakeholder 201 the completeness of the directory is automatically ensured. The default stakeholder 201 is only constrained by "dispute types", which is the default field, and has empty fields for "product", "business unit", and "region". Empty fields, other than in the default column, match in all cases, therefore, "Bob Hess" is a default stakeholder for all 2.2 and 2.3 type disputes. For the situation stakeholders the default field, e.g., 203, is implied to be the same as for the corresponding default stakeholder. Alternatively, for the situation stakeholders, the default field may be made explicit. For example, in FIG. 2 listing "Dispute Type 2.2" and "Dispute Type 2.3".

The default stakeholders are defined by choosing one situation attribute and assigning area stakeholders to handle situations that show specified values for that attribute. Default stakeholders are expected to handle all situations that show the specified value for the given attribute, except for the exceptional situations for which a situation stakeholder is defined.

The exceptional situations need not be enumerated individually, but can be specified in a compact format that allows specifying multiple values for any situation attribute. Exception situation definitions match any actual situation for which the actual attribute values are among the specified values for each of the attributes. For example, referring to FIG. 2, "Jennifer Smith" will match dispute types 2.2 or 2.3 for products 3 or 4 in business unit 1, regardless of region.

That is, an exception specification with n attributes each with $a_1, \ldots, a_n$ specified values is equivalent to a data base of responsibility records with $a_1 * a_2 * \ldots * a_n$ records (Cartesian product). Thus, when attributes have many values and situations have many attributes, it is easy for a single exception specification to cover a large number of specific situation assignments. So, for example, a condensed exception situation specification (a1=v1.1, v1.2, a2=V2.2, V2.5, V2.7) is of equivalent to the 6 specific situation specifications (a1=V1.1, a2=V2.2; a1=V1.1, a2=V2.2; ... a1=V1.2, a2=V2.7).

To further increase the readability of the situation specifications the attribute value specifications that include all possible values for an attribute can be left out. Area assignments and corresponding situation assignments can be easily edited in the Stakeholder Matrix table that lists stakeholder assignments in groups sorted by area (see FIG. 2).

Automatic analysis can further support the entry of exception assignments. For example, a user can be made aware of possible conflicts and overlaps of a new exception assignment that he or she is adding to the matrix. The user can also be presented with alternatives for resolving the identified conflicts.

An alternative compact representation for entering of the stakeholder assignments is a tree. Here the root node and each branching node of the tree have a defined default stakeholder, a defined branching attribute and a number of sub-nodes that specify one or more matching values for the attribute and again a responsible stakeholder and if needed another branching attribute. Thus, in this scheme default stakeholders can be defined at any level (see FIG. 3). The exemplary representation shown in FIG. 3 can be even more compact as the table-based representation as it can combine some of the exception assignments into a single tree node. The exemplary table representation described here provides users without a background in abstract data structures an easier way of understanding what they are specifying.

Referring to FIG. 3, it can be seen that "Peter Pan" 301 is a default stakeholder for all attributes. For the attribute "AAAA" 302 "Captain Hook" 303 is the default stakeholder. Within attribute "DDDD" 304 "Nibs Boy" 305 is the default stakeholder and for various other attributes, e.g., "aaa" 306, a situation stakeholder, e.g., 307, are assigned. As is shown in FIG. 3, a stakeholder matrix may include multiple levels of default stakeholders.

Figure 4A:
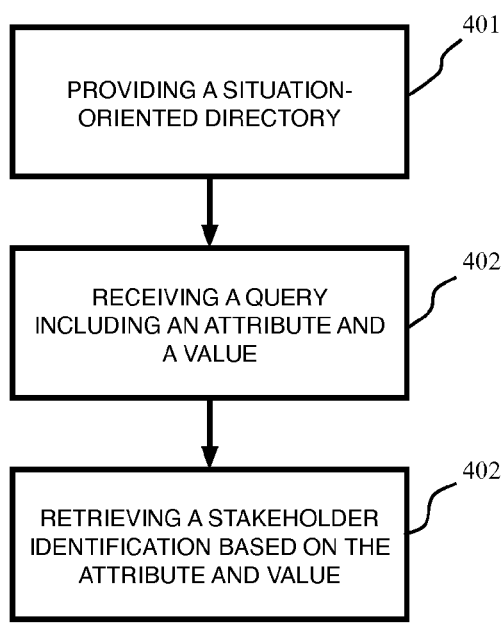
FIG. 4A is a flow chart of a method for selecting a stakeholder according to an embodiment of the present disclosure.

Referring to FIG. 4A, a situation oriented directory is provided 401 and a query is run against the attribute-value combinations of the situation oriented directory 402, which returns a stakeholder identification 403.

Referring to FIG. 4B, a method for compacting a situation-oriented directory into a stakeholder matrix includes receiving the situation-oriented directory as an input 403, identifying situation stakeholders in the situation-oriented directory 404, associating, in the stakeholder matrix, the situation stakeholders with corresponding situations 405, identifying default stakeholders in the situation-oriented directory 406, associating, in the stakeholder matrix, the default stakeholders with situations for which no situation stakeholder is defined in the stakeholder matrix 407, and outputting the stakeholder matrix wherein one stakeholder is assigned for each situation and all situations have one of a default stakeholder and a situation stakeholder such that assignments of stakeholders to situations are complete and consistent 408.

The way that search in the directory is implemented may depend on the way the directory information is stored. One way is to store each individual assignment record in a relational database. Here, standard database queries can be used for retrieving the stakeholder that is responsible for a given situation. An alternative is to use the condensed representation of the directory information not only for editing, but also for searching. When using the table representation the identification of the area stakeholder and the associated exceptions can be done in a single comparison step. However, in the worst case all exceptions to the relevant area assignment must be scanned to answer a search request (e.g., in a situation where none of the exceptions applies). Search using the tree representation of the assignment information can be more efficient if the tree has been constructed in an optimal way. In this case a stakeholder can be found by branching in the tree according to each attribute value only once. That is, if the directory considers n attributes, at most n comparisons are needed to identify the matching stakeholder. In the exemplary implementation the condensed table representation is used directly for searching. This allows us to keep the distinction of area stakeholder assignments and exception stakeholder assignments. The search function returns both the area stakeholder and, if applicable, the exception stakeholder for the given situation.

Using the situation-oriented directory for invoice management described above for analyzing the proposed solution, in the directory 33700 responsibility specifications were needed to completely describe the assignment of stakeholders to each of the possible situations. Analysis of the assignment data showed that with the compact directory representation only 24 area stakeholders (one for each dispute type) and a total of 104 exception situations needed to be defined (some area assignments had no exceptions, others had up to 14 exceptions). Thus, in the compact representation only a total of 128 responsibility specifications were needed instead of the 33700 individual specifications that are needed to enumerate the Cartesian product. Therefore, in this example the compact stakeholder matrix representation reduces the number of necessary specification elements by a factor of more than 300. This significant reduction in the number of specifications is possible because the underlying structure of the stakeholder assignments is relatively simple and no complex combination of "and" and "or" conditions need to be specified. If conditions get more complex, more than one situation assignment for each situation stakeholder is be needed. In such cases the reduction of size would be less significant.

Referring now to additional exemplary implementations including access control and message routing: for access control languages such as XACML (eXtensible Access Control Markup Language) may be used to support the specification of content based access control policies. Access policies specify which subject, e.g., a stakeholder, defined by predicates testing subject attributes, can perform which actions on which resources, defined by predicates testing resource attributes, and under which context conditions. A stakeholder matrix according to an embodiment of the present disclosure may be implemented in such an access control system for specifying a stakeholder.

Content-based message routing and complex event processing use messages and events distributed form "message publishers" to "message subscribers" based on subscription rules that reference content attributes. For example, in JMS (Java Message Service), subscription rules are specified using SQL92 syntax; and thereby, they can define message selection predicates that can reference all defined message attributes to determine whether a message should be forwarded to a particular subscriber. Here, the stakeholder matrix may be used to select a stakeholder subscriber.

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture.

Referring to FIG. 5, according to an embodiment of the present invention, a computer system 501 implementing a stakeholder matrix can comprise, inter alia, a central processing unit (CPU) 502, a memory 503 and an input/output (I/O) interface 504. The computer system 501 is generally coupled through the I/O interface 504 to a display 505 and various input devices 506 such as a mouse and keyboard. The support circuits can include circuits such as cache, power supplies, clock circuits, and a communications bus. The memory 503 can include random access memory (RAM), read only memory (ROM), disk drive, tape drive, or a combination thereof. The present invention can be implemented as a routine 507 that is stored in memory 503 and executed by the CPU 502 to process the signal from the signal source 508. As such, the computer system 501 is a general-purpose computer system that becomes a specific-purpose computer system when executing the routine 507 of the present invention.

The computer platform 501 also includes an operating system and micro instruction code. The various processes and functions described herein may either be part of the micro instruction code, or part of the application program (or a combination thereof) which is executed via the operating system. In addition, various other peripheral devices may be connected to the computer platform such as an additional data storage device and a printing device.

It is to be further understood that, because some of the constituent system components and methods depicted in the accompanying figures may be implemented in software, the actual connections between the system components (or the processes) may differ depending upon the manner in which the present invention is programmed. Given the teachings of the present invention provided herein, one of ordinary skill in the related art will be able to contemplate these and similar implementations or configurations of the present invention.

Situation-oriented directories help to determine the stakeholder responsible for a given situation. Defining all responsibility assignments for a directory can be challenging if situations need to be distinguished by many attributes and some of the attributes have many potential values. The stakeholder matrix is a compact representation of a situation-oriented directory that makes it easier for users to ensure the completeness and consistency of the assignments in the directory. Experimental evaluations showed that in a real world case the number of individual assignments could be compacted from 33700 to 128. This is a reduction by a factor greater than 300 (i.e. 30,000%). Related areas of research were reviewed, in particular expert finding systems, content-based access control and content-based routing. In these areas the problem of creating complete and consistent assignments has not yet been addressed, and that compact representations similar to the stakeholder matrix will be useful to address these needs.

Having described embodiments for a system and method for implementing a stakeholder matrix, it is noted that modifications and variations can be made by persons skilled in the art in light of the above teachings. It is therefore to be understood that changes may be made in the particular embodiments of the invention disclosed which are within the scope and spirit of the disclosure.

What is claimed is:

1. A system implementing a situation-oriented directory for retrieving a stakeholder identification comprising:
   a memory storing data corresponding to the situation-oriented directory including a plurality of pre-defined situations, wherein at least one situation is associated with a plurality of attribute-value combinations, and further wherein each of the plurality of attribute-value combinations is mapped to a single stakeholder identification according to an attribute and a value of the attribute; and
   a processor in communication with the memory for receiving a query and retrieving the stakeholder identification from among the stakeholder identifications based on the attribute-value combinations,
   wherein the data stored in memory includes categories of stakeholders,
   wherein each stakeholder is categorized as one of a default stakeholder, and a situation stakeholder,
   wherein default stakeholders holders handle all situations that show a specified attribute-value combination except for exceptional situations for which a situation stakeholder is defined, and
   wherein the system is configured to allow a user to add exceptional situation assignments, be made aware of possible conflicts between exceptional situation assignments, and be presented with alternatives for resolving the possible conflicts.

2. The system of claim 1, wherein the default stakeholder is assigned to an attribute-value combination in a compact representation of the situation-oriented directory.

3. The system of claim 1, wherein a stakeholder matrix is stored in the memory and specifies the stakeholder identifications in a hierarchical arrangement.

4. The system of claim 3, wherein the hierarchical arrangement comprises multiple levels of default stakeholders.

5. The system of claim 1, further comprising a display for displaying the situation-oriented directory.

6. A method for retrieving a stakeholder identification from a situation-oriented directory comprising:
   providing a data store corresponding to the situation-oriented directory including a plurality of pre-defined situations, wherein at least one situation is associated with a plurality of attribute-value combinations, and further wherein each of the plurality of attribute-value combinations is mapped to a single stakeholder identification according to an attribute and a value of the attribute;
   receiving a query including an attribute and a value; and
   retrieving the stakeholder identification from among the stakeholder identifications based on the attribute-value combinations, wherein situation corresponding to the attribute is located in a stakeholder matrix and one of a default stakeholder and a situation stakeholder is returned,
   wherein the default stakeholder is returned where no situation stakeholder matches the value, otherwise a situation stakeholder matching the value is returned, wherein the default stakeholders holders handle all situations that show a specified attribute-value combination except for exceptional situations for which the situation stakeholder is defined, and wherein a user is allowed to add exceptional situation assignments, be made aware of possible conflicts between exceptional situation assignments, and be presented with alternatives for resolving the possible conflicts.

7. The method of claim 6, wherein the stakeholder matrix comprises a hierarchical set of default stakeholders, including the default stakeholder, wherein the method further comprises selecting the default stakeholder from the set of stakeholders according to a value of a default attribute of the stakeholder matrix corresponding to the default stakeholder.

8. A method for compacting a situation-oriented directory into a stakeholder matrix comprising:

receiving the situation-oriented directory as an input;

identifying situation stakeholders in the situation-oriented directory;

associating, in the stakeholder matrix, the situation stakeholders with corresponding situations according to a plurality of specified attribute-value combinations, wherein the plurality of specified attribute-value combinations are mapped to the situation stakeholders according to an attribute and a value of the attribute such that for each attribute-value combination exactly one situation stakeholder is mapped;

identifying default stakeholders in the situation-oriented directory;

associating, in the stakeholder matrix, the default stakeholders with situations with unspecified attribute-value combinations for which no situation stakeholder is defined in the stakeholder matrix; and outputting the stakeholder matrix wherein one stakeholder is assigned for each situation and all situations have one of a default stakeholder and a situation stakeholder such that assignments of stakeholders to situations are complete and consistent, wherein the default stakeholders holders handle all situations that show a specified attribute-value combination except for exceptional situations for which the situation stakeholder is defined, and wherein a user is allowed to add exceptional situation assignments, be made aware of possible conflicts between exceptional situation assignments, and be presented with alternatives for resolving the possible conflicts.

9. The method of claim 8, wherein the stakeholder matrix is displayed as a hierarchical tree diagram having situation areas at the root, default stakeholders connected to the roots and the situation stakeholders at leaf nodes.

10. The method of claim 8, wherein the stakeholder matrix comprises a hierarchical set of default stakeholders and situation stakeholders.

\* \* \* \* \*